United States Patent [19]
Freeman et al.

[11] Patent Number: 5,466,522
[45] Date of Patent: Nov. 14, 1995

[54] COBALT PLATINUM MAGNETIC FILM AND METHOD OF FABRICATION THEREOF

[75] Inventors: Dennis R. Freeman, Spencerport; Richard C. Soper, Victor, both of N.Y.

[73] Assignee: Eastman Kodak Company, Rochester, N.Y.

[21] Appl. No.: 238,358

[22] Filed: May 5, 1994

Related U.S. Application Data

[63] Continuation of Ser. No. 905,026, Jun. 26, 1992, abandoned.

[51] Int. Cl.$^6$ .................... B32B 5/16; G11B 5/66
[52] U.S. Cl. .................... 428/332; 428/336; 428/611; 428/664; 428/665; 428/666; 428/667; 428/668; 428/670; 428/694 T; 428/694 TS; 428/694 SG; 428/900; 428/928; 204/182.1; 204/182.12; 204/182.15; 204/182.2
[58] Field of Search .................... 428/665, 666, 428/667, 668, 694 T, 900, 978, 611, 664, 670, 684 TS, 332, 336, 694 SG; 204/192.1, 192.12, 192.15, 192.2

[56] References Cited

U.S. PATENT DOCUMENTS

| | | | |
|---|---|---|---|
| 4,125,446 | 11/1978 | Hartsough et al. | 204/192 |
| 4,353,788 | 10/1982 | Jeffrey et al. | 204/192 |
| 4,587,179 | 5/1986 | Nakamura | 428/694 |
| 4,596,646 | 6/1986 | Kitada et al. | 204/192 M |
| 4,756,811 | 7/1988 | Takeoka et al. | 204/192.26 |
| 4,778,582 | 10/1988 | Howard | 204/192.15 |
| 4,902,583 | 2/1990 | Brucker et al. | 428/665 |
| 4,957,604 | 9/1990 | Steininger | 204/192.16 |

FOREIGN PATENT DOCUMENTS

| | | |
|---|---|---|
| 0576376 | 12/1993 | European Pat. Off. . |
| 84/013607 | 1/1984 | Japan . |
| 01/119937 | 11/1987 | Japan . |
| WO-A-9108578 | 6/1991 | WIPO ............. G11B 11/10 |

OTHER PUBLICATIONS

"Perpendicular Magnetic Anisotrophy of Tb–Co Amorphous Films Sputtered in $H_2$–Added Ar Gas", Niihara et al., Appl. Phys. Lett., vol. 45, No. 8, pp. 872–874.
IEEE Transactions of Magnetics, vol. 28, No. 5, Sep. 1990, pp. 2409–2411, N. Smith et al.
Patent Abstracts of Japan, vol. 15, No. 387 (E–1117) 30 Sep. 1991 & JP–A–03–155 606 (Toshiba Corp.) 3 Jul. 1991.

Primary Examiner—L. Kiliman
Attorney, Agent, or Firm—Charles E. Snee, III; Lee J. Fleckenstein

[57] ABSTRACT

A cobalt-platinum (CoPt) magnetic film is deposited onto a chromium (Cr) or tungsten (W) underlayer on a substrate, or is deposited directly onto the substrate and has an appreciable component of its C-axis which is parallel to the [00.2] direction, lying in the plane of the film whereby the resultant magnetic films exhibit coercivities from 2100–3000 oersteds.

16 Claims, 2 Drawing Sheets

COBALT PLATINUM MAGNETIC FILM AND METHOD OF FABRICATION THEREOF

This application is a continuation of application Ser. No. 07/905,026, Jun. 26, 1992, now abandoned.

FIELD OF THE INVENTION

This invention relates to a cobalt platinum (CoPt) magnetic film and, in particular, to such a film which, when deposited at thicknesses greater than 300 nanometers, maintains high coercivity and to a method of depositing such a magnetic film.

BACKGROUND

The use of CoPt as a magnetic material for fabricating both bulk and deposited magnets is well known in the art. For example, because of its magnetic properties, thin film CoPt has been utilized as an anhysteretic recording medium in magnetic disks and as a permanent magnet in the biasing of a magnetoresistive head. For both longitudinal recording and permanent magnets, the preferred CoPt film is a polycrystalline structure consisting of close packed hexagonal crystallites, whose C-axes lie in or have an appreciable component lying in the plane of the film.

The external magnetic field produced by a permanent magnet is proportional to the product of the energy product (HB) and the volume of the magnet. The energy product (HB) of a magnetic film is directly affected by the magnetic induction value B, coercivity (Hc), squareness ratio (SR) and saturation magnetization (Ms). A recording head (write head) must be capable of creating a magnetic field strong enough to magnetically transfer information to a tape. Typically, the ability of a particular recording head to transfer information to a particular tape depends upon the energy product of the head relative to the tape. As mentioned above, the energy product of a film is largely dependent upon its coercivity. Generally, to record from a write head to a tape, the coercivity of the film on the write head must be roughly twice that of the tape. Thus, to record from a write head to a magnetic tape having a coercivity of about 1000 Oersteds (Oe), the write head must have a film deposited thereon having a coercivity of about 2000 Oe, assuming the relative thicknesses of the two films are roughly the same. Consequently, if the coercivity of the write head magnetic film is less than 2000 Oe, it would probably have to be deposited at a greater thickness to be effective.

The methods of the prior art teach a wide variety of deposition techniques for CoPt magnetic films. For example, CoPt deposition can be achieved with or without the use of an underlayer, which may be chosen from various different materials, such as Cr or W. Also, the composition of the CoPt sputtering targets and the temperature of the substrate may be varied. Although the above parameters and others have been varied to yield CoPt films having various properties, all of the prior art films have exhibited relatively larger decreases in coercivity with increasing film thickness, especially at thicknesses greater than 300 nm. Furthermore, the decreasing coercivity effect is accentuated when the prior art films are deposited on rotating substrates. On rotating substrates, using the methods of the prior art, it is difficult to achieve a coercivity of 1800 Oe for magnetic films having a CoPt thickness greater than 400 nm.

For example, U.S. Pat. No. 4,902,583 to Brucker et al., the disclosure of which is hereby incorporated by reference, discloses the deposition of cobalt platinum magnetic films having a CoPt thickness of 300–1,000 nanometers. The films are deposited onto non-moving substrates and result in coercivites as high as about 2,000 Oe. This is achieved by optimizing the "throw distance" to ensure adequate "thermalization" of the depositing CoPt atoms, i.e. the reduction of particle energy to about 0.039 electron volts. Brucker states that the coercivity of these magnetic films decreases as film thickness increases.

The decrease in coercivity inherent with increasing thickness in prior art CoPt films has prevented sputtered CoPt films from being used in some applications, for example, as a permanent magnet for biasing a magnetoresistive head. Prior attempts to increase the external magnetic field of a CoPt film by increasing the film thickness have been defeated by the rapid decrease in coercivity inherent with increasing film thickness. U.S. Pat. No. 4,596,646 suggests a solution to this problem by stacking deposited CoPt films of thickness 100–120 nm, separated by silicon dioxide insulating layers, to attain a magnet of requisite volume. However, as the number of $SiO_2$/CoPt layers increases, so does the relative cost of the deposition process.

U.S. Pat. No. 4,778,582 to Howard teaches the sputter deposition of Co77 Pt Cr film over a Cr80 V underlayer, which is deposited in an atmosphere of argon and hydrogen. Unlike Applicants' invention, Howard's films are not CoPt and they do not exhibit increased coercivity with increased hydrogen content, as evidenced by FIG. 1 therein. Further, unlike Applicants' invention, Howard teaches that his films require a hydrogenated carbon overcoat. The reference discloses films having a coercivity approximating 1600 Oe, and states that the hydrogen present in the sputtering atmosphere has no adverse affect on the magnetic properties of the recording disk.

Thus, there continues to be a need for a CoPt magnetic film which, when deposited at thicknesses of 300 nm and higher, still has a high coercivity, i.e., above about 2100 oersteds, and preferably above about 2300 oersteds. Further, there continues to be a need for a method to deposit high coercivity CoPt films, especially those having a coercivity above about 2,000 Oe, on rotating substrates, such as, for example, cylindrical recording drums.

SUMMARY OF THE INVENTION

In accordance with the present invention, a method is provided for depositing magnetic films comprised of an overlayer and a polycrystalline CoPt underlayer. These magnetic films exhibit coercivities above 2100, and preferably above 2500 Oe, even at thicknesses of 200 nm and higher, and regardless of whether the substrate is stationary or moving. If configured at a sufficient thickness, the magnetic films of the invention generate a magnet volume sufficient to generate an external field suitable for very efficient anhysteretic biasing of an adjacently positioned magnetoresistive element.

To fabricate the magnetic film of the invention, a suitable underlayer material, such as, for example, Cr or W, is first sputtered onto the substrate, after which a CoPt film is sputtered over the underlayer. A conventional sputtering apparatus may be used. It has been discovered that by controlling the sputtering atmosphere to include a sufficient percentage of hydrogen gas mixed with one or more of the typically used inert gases, such as, for example, argon or xenon, higher coercivities can be obtained, at greater film thicknesses, than were previously thought possible. The process of the present invention may be used to deposit magnetic films having high coercivity, regardless of whether the substrate is rotating or otherwise moving.

DETAILED DESCRIPTION OF THE INVENTION

Figure 1:
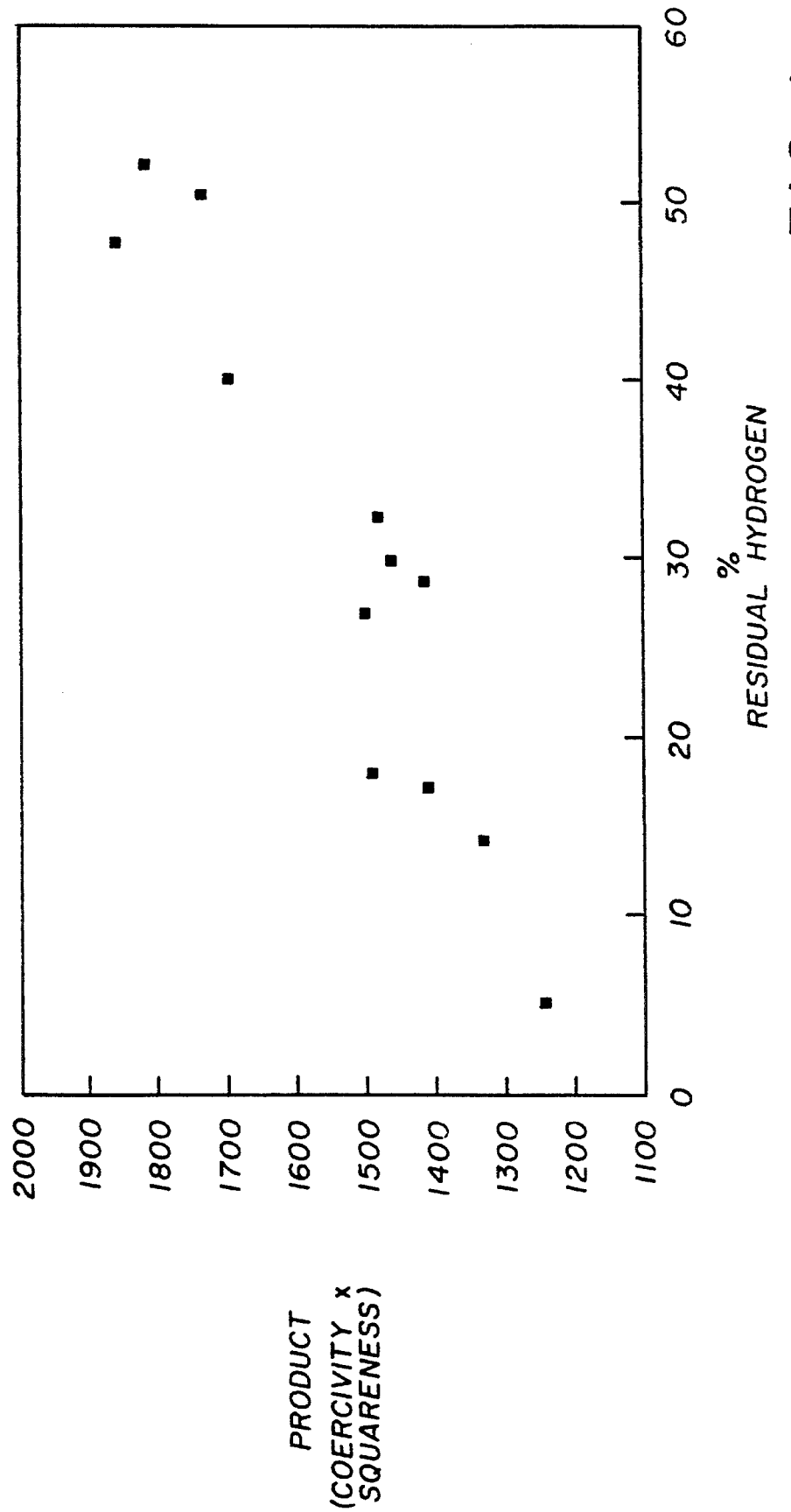
FIG. 1 illustrates the effect of the amount of residual hydrogen on the product of coercivity and squareness.

In accordance with the present invention, a method is provided for producing thin film magnetic mediums comprising an intrinsically high coercivity alloy of cobalt platinum sputtered over a suitable underlayer such as chromium. The type of sputtering apparatus used is not critical, and may be, for example, a DC or RF magnetron sputtering apparatus. In a preferred embodiment, the film is sputtered onto a substrate using a TRIMAG™ sputtering apparatus. The sputtering takes place in an atmosphere which includes a mixture of an inert gas, such as, for example, argon or xenon, and a quantity of hydrogen gas. Different results can be obtained depending upon which inert gas is used. For example, argon and hydrogen atmospheres in accordance with the present invention generally deposit films more quickly than xenon and hydrogen atmospheres, while xenon and hydrogen atmospheres generally result in higher coercivities than argon and hydrogen atmospheres. It is believed that the presence of a sufficient amount of hydrogen displaces residual oxygen that might otherwise be present. When a sufficient amount of hydrogen is present in the sputtering chamber, the resultant CoPt based film exhibits excellent magnetic properties. Also, if the substrate surface is to be pretreated prior to sputtering, the presence of hydrogen during pretreatment steps, such as during a glow discharge sputtering pretreatment, positively affects the coercivity of the resulting film.

In sputter deposition processes, prior to the deposition of metal films, the interior of the sputtering chamber is pumped down, for example, by a cryopump to a suitable vacuum base pressure. In a preferred embodiment of the invention, for example, the base pressure is less than $5\times10^{-7}$ torr. After the desired vacuum is achieved, the surface of the substrate is preferably pretreated using a glow discharge pretreatment, which may be in an inert gas atmosphere. More preferably, in accordance with the present invention the glow discharge pretreatment is conducted in an atmosphere of hydrogen and an inert gas. It should be noted that the purpose of the glow discharge pretreatment is to prepare the surface for the next film to be deposited, and is not necessarily critical to achieving high coercivity films. However, in the preferred embodiment, surface preparation by glow discharge, etc., is recommended since films deposited using this technique typically exhibit higher coercivities. After substrate surface pretreatment, the system is pumped down to the previous base pressure. A suitable underlayer coating, such as, for example, W or Cr, is then sputtered onto the substrate. A preferred undercoat material is Cr. The undercoat material may be deposited in an inert gas atmosphere, but preferably a mixed inert gas and hydrogen gas atmosphere is used for deposition of the undercoat. The hydrogen content in the sputtering chamber during undercoat deposition is preferably greater than 4 mole percent, more preferably greater than 10 mole percent, and most preferably greater than 20 mole percent. The undercoat is typically deposited at a thickness of about 120 nm, although the invention as disclosed herein is operable for other undercoat thicknesses. In order to facilitate explanation of the invention, however, the CoPt magnetic films discussed herein will be restricted to those having an undercoat of chromium approximately 120 nm thick.

After the underlayer is deposited, the surface of the underlayer is preferably pretreated by exposure to a glow discharge. The glow discharge is preferably conducted in a hydrogen and argon containing atmosphere. The hydrogen content in the sputter chamber during glow discharge pretreatment is preferably greater than 4 mole percent, more preferably greater than 10 mole percent, and most preferably greater than 20 mole percent. Glow discharge of the chromium underlayer prior to CoPt deposition has a beneficial effect on the coercivity of the entire magnetic film, particularly when it occurs in an atmosphere containing hydrogen. In systems which utilize cryopumps, i.e., those that are not capable of efficiently removing hydrogen gas from the deposition chamber, hydrogen content in the deposition chamber can be increased by allowing a hydrogen containing gas to "flow" into the chamber. In the apparatus used to discover the present invention, for example, a constant flow of a mixture of 4 percent $H_2$ in argon gas into the sputter chamber would result in atmospheres having hydrogen mole fractions greater than 4 percent, due to the inefficiency of the cryopump in removing hydrogen. Consequently, in some of the examples disclosed herein, the percentage of hydrogen in the atmosphere was increased by conducting a "flow" of 4 percent hydrogen in argon gas into the sputter chamber. For example, this procedure was successfully conducted in several instances prior to glow discharge pretreatment, in order to conduct the glow discharge in an atmosphere containing a sufficient mole fraction of hydrogen.

After surface pretreatment of the underlayer by glow discharge, a film of CoPt is sputter deposited over the underlayer film. A preferred composition for the CoPt layer is about 80 atomic percent Co, 20 atomic percent Pt. In order to achieve high coercivity magnetic films in accordance with the invention, it is important that the CoPt be deposited in an atmosphere containing a sufficient amount of hydrogen. The coercivities of the deposited CoPt films generally increase as the concentration of hydrogen during CoPt deposition increases. A beneficial effect on the coercivity of these films is very noticeable at concentrations of hydrogen during CoPt deposition as low as 17 percent mole fraction. Substantial increases in coercivity have been achieved using hydrogen mole fractions of 20 percent and above. More preferably, hydrogen mole fraction is at least 30 percent, and most preferably the hydrogen mole fraction is at least 50 percent. In atmospheres containing argon and about 30–50 percent mole fraction hydrogen, for example, magnetic Cr/CoPt films have been deposited having coercivities above 2400 Oe. Vacuum base pressure prior to deposition is preferably maintained at about the $10^{-7}$ torr range or lower. More preferably, the base pressure is maintained below $5\times10^{-7}$ torr.

In another preferred embodiment, one or more of the deposition steps described above (glow discharge pretreatment, underlayer deposition, CoPt deposition, etc.) involves utilizing an atmosphere containing xenon, preferably in a concentration of at least 5 mole percent. For example, deposition of the CoPt in atmosphere containing xenon and hydrogen have resulted in coercivities above 2900 oersteds, at thicknesses of about 200 nm.

The process of the present invention may be used to deposit magnetic films which exhibit high coercivity, regardless of whether the substrate is rotating or otherwise moving, and which maintains a high coercivity as the thickness of the deposited film increases. Because relatively thick CoPt films may now be deposited in accordance with the invention without sacrificing high coercivity values, higher performance anhysteretic recording is now possible using these films. Also, the ability to obtain high coercivities at greater film thickness allows the use of a single Cr/CoPt or W/CoPt structure, eliminating the need for multiple underlayer/CoPt coatings. Consequently, magnetic recording devices utilizing the films of the present invention are more cost-efficient to produce than those of the prior art.

Also, the process of the present invention may be used to deposit high coercivity magnetic films regardless of whether the substrate is rotating or otherwise moving. Consequently, because the present invention may successfully be utilized to deposit high coercivity films on moving substrates, complex shapes such as cylindrical drums or read/write heads may be coated and utilized for anhysteretic recording.

At a CoPt thickness of greater than 400 nm, the films of the present invention typically exhibit an energy product greater than 14.0 kilogauss, a coercivity (Hc) greater than 2000 Oe, and a squareness ratio (SR) greater than 0.72 (CoPt thickness, as used herein and in the claims, refers to the thickness of the CoPt layer only, and does not include the 120 nm chromium underlayer).

The saturation magnetization of the magnetic films of the present invention typically is about 14.1–14.5 Kilogauss, which infers a bulk density of about 93–97 percent. This is arrived at by calculating the maximum coercivity for 80/20 atomic percent CoPt from the depletion curve cited in "Magnetocrystalline Anisotropy and Phase Transformation in CoPt Alloy, F. Bolzoni, et al., IEEE Transactions on Magnetics, Vol. MAG-20, No. 5, September, 1984. The calculated maximum bulk density is 15.055 Kilogauss.

The films have a preferred orientation with the C-axis of the film oriented substantially parallel to the plane of the substrate, as indicated by the ratio of (002)/(001)+(101) X-ray diffraction peak intensities generally being of less than 0.4.

It is possible to deposit the films of the present invention at relatively low temperatures (<50° C.) and still obtain high-coercivity films. This is advantageous when coating on temperature sensitive substrates, such as, for example, poly-(ethylene terephthalate)(PET) or other polymeric films.

The films of the present invention may be deposited on relatively rough surfaces, such as polyimide, which is sold, for example, under the tradename of Kapton™.

The magnetic films of the invention, when deposited at a Cr-thickness of 120 nm and a CoPt thickness of 400–500 nm, exhibit an improved hardness over CoPt films formed without hydrogen. The hardness of the CoPt films of the present invention typically is approximately 14.3±0.5 GPa at a depth of 150 nm, and about 20 GPa at a depth of 300 nm. Consequently, for anhysteretic recording applications, the magnetic films of the present invention generally do not require a protective overcoat. Further, the magnetic films of the present invention exhibit an increased stiffness, or modulus of elasticity, when compared with films of the prior art.

The invention may be more easily comprehended by reference to specific examples. It must be understood, however, that these examples are provided only for purposes of illustration, and that the invention may be practiced otherwise than as specifically illustrated without departing from its spirit and scope.

EXAMPLES

EXAMPLE 1

The following processes were conducted in a conventional DC TRIMAG™ sputtering apparatus having a vacuum system pumped by a conventional cryopump. The sputtering chambers were provided with commercially available sputtering guns and targets capable of depositing a chromium underlayer and a CoPt toplayer (80 atomic percent Co). The inert sputtering gas was Ar (purity:UHP, 5–9's). When $H_2$ was used, it was in the form of a 4 percent mixture with Ar. However, because the cryopump being used to maintain vacuum pressure was not capable of efficiently removing hydrogen, the $H_2$ content in the sputter chamber rose to mole fractions greater than 4 percent. In the following processes A through F, an approximately 120 nm Cr underlayer and an approximately 400 nm CoPt film was deposited in varying atmospheres to compare the effect of $H_2$ gas during deposition and/or glow discharge pretreatment. To increase the amount of hydrogen in the sputtering chamber, a gaseous mixture of 4 percent hydrogen in argon was allowed to flow into the chamber for a period of time, during which only argon was being substantially removed by the cryopump. For each process, the sputtering chamber atmosphere was analyzed immediately after CoPt deposition using a residual gas analyzer (RGA). Residual hydrogen, oxygen, and water content was determined by analyzing the RGA scan using the "total peaks" method. The results are listed in Table 1 below. Also listed in Table 1 are coercivity (HC) in oersteds, squareness ratio (SR), and C-axis orientation ratio (Ratio) for each process. The C-axis orientation was determined by analyzing the films using x-ray diffraction, and then calculating the ratio of the intensities of the (002)/(100)+(101) x-ray diffraction peaks. Generally, the smaller this ratio is, the greater the in-plane orientation of the C-axis of the hexagonal CoPt crystals and the better the squareness. Base pressure prior to either of tile film (Cr or CoPt) depositions was less than $2.5 \times 10^{-7}$ torr. For each of process A through F, the substrates were held in a cylindrical configuration and rotated above the sputtering source during deposition to imitate deposition onto a cylindrical recording drum.

Process A illustrates a preferred embodiment of the present invention. Process B generally illustrates a deposition technique disclosed in U.S. Pat. No. 4,902,583. Process C through F are identical to Process B, except that, in each of the Processes C through F, one of the Process B steps is conducted in a $H_2$ and Ar atmosphere, rather than in an argon atmosphere.

Process A

In process A, which illustrates one embodiment of the present invention, the substrate surface was first given a 20-min glow discharge pretreatment in Ar, after which the system was pumped to the previous 'Base Pressure'. A film of Cr approximately 120 nm thick was then deposited in an Ar atmosphere. The sputter chamber and the surface of the Cr film was then prepared using a glow discharge pretreatment. The sputtering chamber was given a 5-min flow of 4 percent $H_2$ in Ar gas to increase the hydrogen mole fraction in the sputtering atmosphere, followed by 10-min glow discharge in the Ar and $H_2$ atmosphere, followed by another 5-min flow with 4 percent $H_2$ in Ar gas. A mixture of 4 percent $H_2$ in Ar was then allowed to flow into the sputtering chamber as a film of CoPt was deposited by sputter deposition. As evidenced by the residual gas results listed in Table 1, which were measured immediately after CoPt deposition, hydrogen mole fraction rose a considerable amount over the 4 percent that was being added to the sputtering chamber, due to the cryopump's inefficiency at removing hydrogen.

Process B

Process B is an example of the prior art, namely, the method disclosed in U.S. Pat. No. 4,902,583. Like Process A, while argon gas was allowed to flow into the sputtering chamber, the substrate surface was first pretreated with a glow discharge for 20 minutes, followed by pumping the sputter chamber back to the original base pressure and then sputtering an underlayer of chromium in an argon atmosphere on the substrate. Up to this point, process B is the same as process A. However, in the subsequent steps, unlike process A, there was no glow discharge pretreatment, and only argon gas was allowed to flow into the deposition chamber as the CoPt film was deposited. The 14.7 percent residual hydrogen detected immediately after CoPt deposition (see Table 1) was due to prior experiments which included hydrogen gas in the sputtering gas.

Process C

In Process C, the substrate surface was first pretreated with a glow discharge for 20 minutes in argon, after which the sputter chamber was pumped back to the original base pressure. A mixture of 4 percent hydrogen in argon gas was then allowed to flow into the sputter chamber. An underlayer coating of Cr was deposited in the resultant atmosphere of 4 percent $H_2$ in Ar. Argon gas was then allowed to flow into the sputter chamber as a CoPt film was deposited over the Cr underlayer.

Process D

In Process D, a mixture of 4 percent $H_2$ in argon gas was allowed to flow into the sputtering chamber. The substrate surface was then pretreated with a glow discharge in the resultant $H_2$ and Ar mixed atmosphere. The sputter chamber was then pumped back to the original base pressure and an underlayer of Cr was sputtered as argon gas was circulated into the sputtering chamber. Argon gas was then allowed to flow into the sputter chamber, and a CoPt film was then deposited in the resultant argon atmosphere.

Process E

In Process E, the substrate surface was first pretreated with a glow discharge for 20 minutes as argon gas was circulated into the chamber. This was followed by pumping the sputter chamber back to the original base pressure and then sputtering an underlayer of chromium on the substrate as argon was circulated into the chamber. A CoPt film was then deposited as a 4 percent $H_2$ in argon gas mixture was circulated into the sputtering chamber.

Process F

In Process F, the substrate surface was first pretreated with a glow discharge for 20 minutes in the presence of an argon flow, followed by pumping the sputter chamber back to the original base pressure and then sputtering an underlayer of chromium on the substrate in the presence of an argon flow. The sputtering chamber was then given a five minute flow of 4 percent hydrogen in argon, after which a 10 minute glow discharge was conducted in the resultant hydrogen and argon atmosphere. A film of CoPt was then deposited as argon gas was pumped into the sputtering chamber.

TABLE 1

| Process Used | Ratio | Hc (Oe) | SR | $RH_2$ | $RO_2$ | $RH_2O$ |
|---|---|---|---|---|---|---|
| Process A | 0.430 | 2456 | 0.741 | 51.7 | 1.0 | 30.2 |
| Process A | 0.376 | 2313 | 0.735 | 39.7 | 6.1 | 28.8 |

TABLE 1-continued

| Process Used | Ratio | Hc (Oe) | SR | $RH_2$ | $RO_2$ | $RH_2O$ |
|---|---|---|---|---|---|---|
| Process A | 0.172 | 2416 | 0.748 | 32.6 | 2.2 | 50.7 |
| Process B | 0.709 | 1883 | 0.706 | 14.7 | 2.0 | 52.3 |
| Process C | 1.449 | 2050 | 0.691 | 17.4 | 3.5 | 46.5 |
| Process D | 1.075 | 2134 | 0.697 | 17.9 | 2.4 | 47.6 |
| Process E | 0.152 | 2027 | 0.740 | 26.8 | 3.1 | 47.3 |
| Process F | 0.179 | 2086 | 0.768 | 3.8 | 0.1 | 61.0 |

As evidenced by Table 1, films utilizing hydrogen in one or more of the deposition steps generally exhibited better in-plane orientation of the C-axis, higher coercivity, and better squareness. More importantly, the use of hydrogen during glow discharge and/or Cr or CoPt deposition increased coercivity, as evidenced by comparing Process B results to Process C through F. Further, note that the film prepared using process A had coercivities of from 2313 to 2456 oersteds. The highest reported values for a CoPt magnetic film prior to the present invention was about 2000 oersteds.

Using the method of the present invention, a magnetic film having a single 1500 nm CoPt film was deposited on a rotating substrate, resulting in a coercivity of 1800 oersteds. Because the films of the present invention can be deposited at such great thicknesses while maintaining their high coercivity, these films are more efficient in anhysteretic recording application than previously known magnetic films. This advantage over prior art methods is particularly noticeable when compared to other CoPt films deposited on rotating substrates.

Table 2 below illustrates the detrimental effect a rotating substrate has on prior-art CoPt deposition processes, while films prepared in accordance with the present invention remain relatively unaffected by rotation. The values listed under prior art are reported values taken from U.S. Pat. No. 4,902,583.

TABLE 2

| | For CoPt films 400–500 nm thick Coercivity, Oe | |
|---|---|---|
| | Process A | Prior Art |
| Static | >=2400 | 1850–2000 |
| Rotating | >=2400 | 1500–1750 |

The energy product of a magnetic film is proportional to the product of coercivity and the squareness ratio. FIG. 1 illustrates a series of experiments conducted to show how the product of the coercivity Hc and the squareness ratio SR (Hc×SR) is dependent on the residual $H_2$ in the deposition chamber.

In a series of films deposited using Process A, the residual hydrogen content present during CoPt deposition was varied. Residual hydrogen was measured directly after CoPt deposition. The results, plotted in FIG. 1, illustrate that there is a strong relationship between the product of Hc and SR and the amount of residual $H_2$ present during CoPt deposition.

Figure 2:
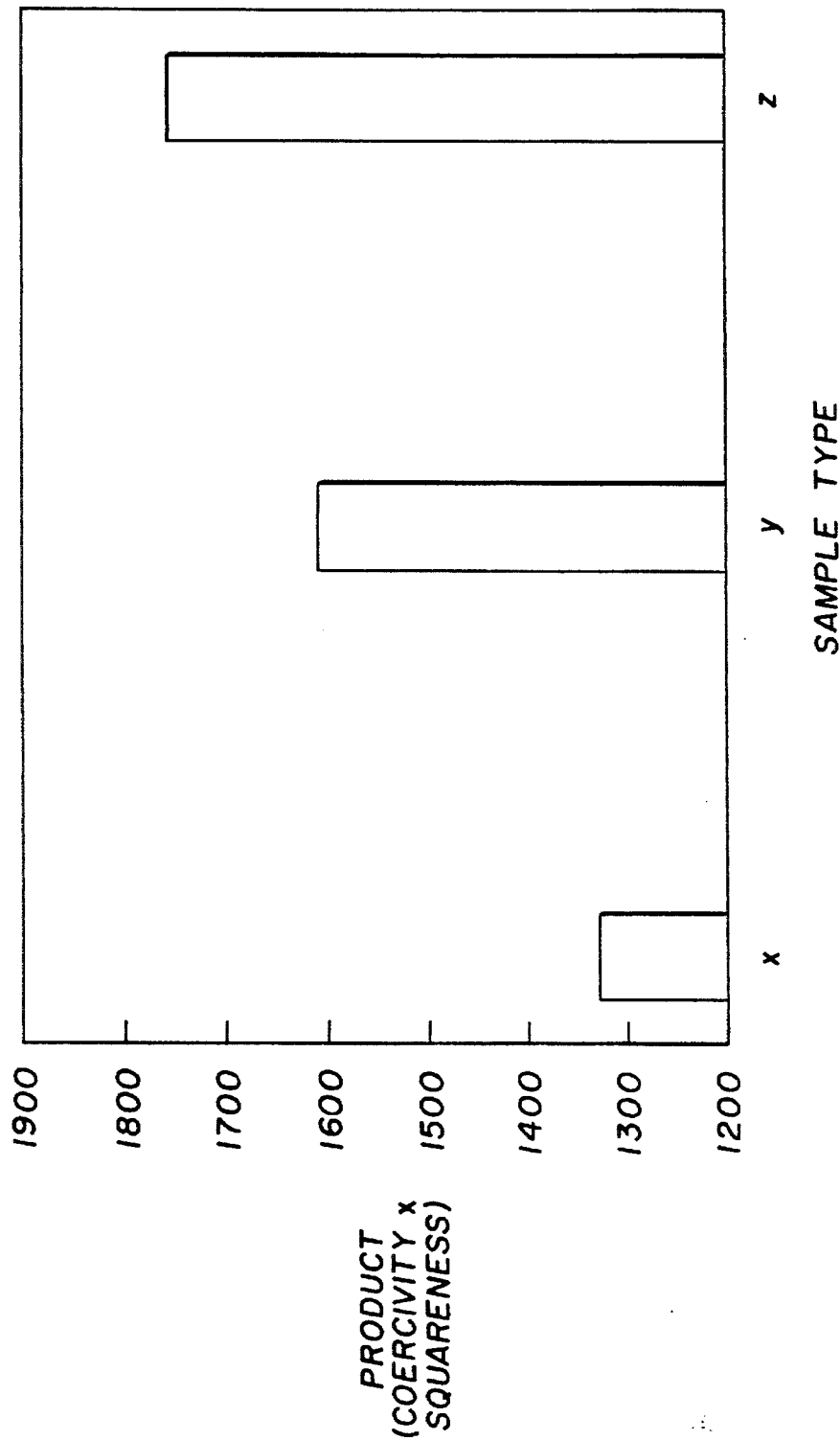
FIG. 2 illustrates the effect of various pretreatment steps to a Cr underlayer film.

FIG. 2 illustrates a series of experiments performed to determine the effect on the product of coercivity and squareness ratio of treating the Cr underlayer with various pretreatment steps. Sample X was prepared using Process B described in Example 1. Thus, Cr deposition was conducted with an argon flow, and there was no glow discharge pretreatment of the Cr undercost prior to deposition of the CoPt layer while argon was being pumped into the chamber.

Sample Y was prepared using a similar process, except that after the Cr deposition, and prior to CoPt deposition, a five minute flow of a gaseous mixture of 4 percent hydrogen in argon was conducted to increase the amount of hydrogen in the atmosphere (during CoPt deposition). Sample Z was also given a five minute flow of a gaseous mixture of 4 percent hydrogen in argon, followed by a glow discharge in the resultant hydrogen and argon containing atmosphere, after which CoPt was deposited while argon gas was circulated into the chamber. The resultant coercivities, illustrated in FIG. 2, show that coercivity is higher in sample Y then sample X, due to the greater $H_2$ concentration during CoPt deposition. The sample having the highest coercivity was sample Z, which utilized both a $H_2$ flow (to increase hydrogen content) and the glow discharge pretreatment step prior to CoPt deposition.

Table 3 illustrates the ability of Process A to deposit 400 nm thick high coercivity CoPt films on low temperature substrates and substrates having a rough surface. Poly(ethylene terephthalate) (PET) is a material having a relatively low glass transition temperature, while Kapton™ and Upilex™ are polyimides which have relatively high glass transition temperature. Silicon is more refractory than either Kapton or Upilex. Of these materials, Kapton 100 HN has the roughest surface, followed by Kapton 500 HN, then Upilex 100 S and then silicon. As is evident by the resultant coercivities listed in Table IV below, a 400 nm CoPt film deposited using process A from Example I achieved a coercivity of at least 2400 Oe, regardless of the glass transition temperature sensitivity of the substrate, and regardless of the surface roughness of the substrate.

TABLE 3

| Substrate | Hc | SR | $4\pi$ Ms |
|---|---|---|---|
| Si | 2442 | 0.814 | 14.28 K-G |
| PET | 2417 | 0.709 | N/A |
| Kapton 100HN | 2415 | 0.719 | N/A |
| Kapton 500HN | 2527 | 0.726 | N/A |
| Upilex 100S | 2481 | 0.735 | N/A |

EXAMPLE 2

This example illustrates the beneficial effects of depositing the CoPt layer in an atmosphere containing a gaseous mixture of hydrogen and xenon. The same sputtering apparatus used in the above examples were employed. The gas admitted to the sputtering chamber prior to CoPt deposition was a mixture of 4 percent hydrogen mixed with Ar. However, because the cryopump being used to maintain vacuum pressure was not capable of efficiently removing hydrogen, the $H_2$ content in the sputter chamber rose to mole fractions greater than 4 percent. Base pressure prior to both film depositions was less than $2.5 \times 10^{-7}$ torr. The substrates were held in cylindrical configuration and rotated above the sputtering source during deposition to imitate a cylindrical recording drum. The substrate surface was first given a 20-min glow discharge pretreatment in the hydrogen and argon atmosphere, after which the system was pumped to the previous 'Base Pressure'. Prior to Cr deposition the hydrogen mole fraction in the sputter chamber was about 17 percent, partly due to the glow discharge pretreatment, and partly due to prior experiments which had utilized hydrogen in the sputtering atmosphere. As a gaseous mixture of 4 percent hydrogen in argon was circulated into the sputtering chamber, a film of Cr approximately 120 nm thick was deposited, after which the surface of the Cr film was pretreated prior to CoPt deposition using a 10 minute glow discharge in the resultant Ar and $H_2$ atmosphere. After this glow discharge pretreatment, the hydrogen content inside the sputtering chamber was approximately 62 percent (measured by RGA). One hundred percent xenon gas was then allowed to flow into the sputtering chamber, and a film of CoPt (80/20 atomic ratio) approximately 200 nm thick was deposited over the Cr underlayer. Because of the cryopumps ability to remove the argon gas faster than the xenon gas was flowing into the sputtering chamber, the hydrogen content actually increased (from 62 to 92 percent) during CoPt deposition, even though the only gas flowing into the sputtering atmosphere was 100 percent xenon. The resultant magnetic film exhibited a coercivity of 2980 oersteds and a squareness ratio of 0.745.

The invention has been described in detail with particular reference to preferred embodiments thereof, but it will be understood that variations and modifications can be effected within the spirit and scope of the invention.

We claim:

1. An improved magnetic film comprising:
    a substrate;
    an underlayer deposited on said substrate; and
    a CoPt film sputter deposited following glow discharge on said underlayer, wherein the coercivity of said magnetic film is greater than 2000 Oersteds and the squareness ratio of said magnetic film is greater than 0.72, and the thickness of said CoPt film is at least 400 nm and wherein said CoPt film is sputter deposited or said glow discharge is executed in an atmosphere containing at least 30 mole percent hydrogen gas.

2. The magnetic film of claim 1, wherein said underlayer is selected from the group consisting of Cr and W.

3. The magnetic film of claim 1, wherein said magnetic film has a coercivity greater than 2300 oersteds.

4. The magnetic film of claim 1, wherein said magnetic film has a coercivity greater than 2800 oersteds.

5. The magnetic film of claim 1, wherein said magnetic film has an energy product greater than 14 kilogauss.

6. The magnetic film of claim 1, wherein said magnetic film is deposited on a complex shaped surface.

7. The magnetic film of claim 1, wherein said magnetic film has a hardness of greater than 14 G. Pascals ah a depth of 150 nm.

8. The magnetic film of claim 1, wherein the bulk density of the CoPt film is at least 13 $g/cm^3$.

9. The magnetic film of claim 1 wherein said atmosphere contains at least 50 mole percent hydrogen.

10. The magnetic film of claim 1 wherein said atmosphere further contains xenon.

11. The magnetic film of claim 6, wherein said complex shaped surface comprises a curved surface.

12. The magnetic film of claim 6, wherein said complex shaped surface comprises a cylindrical surface.

13. The magnetic film of claim 12, wherein the thickness of said CoPt film is greater than 500 nm.

14. The magnetic film of claim 12, wherein the thickness of said CoPt film is greater than 1000 nm.

15. The magnetic film of claim 12, wherein the underlayer is selected from the group consisting of Cr and W.

16. An anhysteretic recording device comprising the magnetic film of claim 12.

* * * * *